(12) United States Patent
Lambert et al.

(10) Patent No.: US 8,442,216 B2
(45) Date of Patent: May 14, 2013

(54) FAULT DETECTION IN EXPONENTIATION AND POINT MULTIPLICATION OPERATIONS USING A MONTGOMERY LADDER

(75) Inventors: Robert J. Lambert, Cambridge (CA); Nevine Ebeid, Kitchener (CA)

(73) Assignee: Certicom Corp., Mississauga, Ontario (CA)

( * ) Notice: Subject to any disclaimer, the term of this patent is extended or adjusted under 35 U.S.C. 154(b) by 696 days.

(21) Appl. No.: 12/259,433

(22) Filed: Oct. 28, 2008

(65) Prior Publication Data

US 2009/0113252 A1    Apr. 30, 2009

Related U.S. Application Data

(60) Provisional application No. 60/983,872, filed on Oct. 30, 2007.

(51) Int. Cl.
*H04L 9/00* (2006.01)
*G06F 11/30* (2006.01)

(52) U.S. Cl.
USPC ............. 380/28; 380/29; 380/30; 713/187; 713/188; 713/189; 713/190; 713/191

(58) Field of Classification Search .............. 380/28
See application file for complete search history.

(56) References Cited

U.S. PATENT DOCUMENTS

| | | | |
|---|---|---|---|
| 6,738,478 B1 | 5/2004 | Vanstone et al. | |
| 6,782,100 B1 | 8/2004 | Vanstone et al. | |
| 7,215,773 B1 | 5/2007 | Johnson | |
| 7,774,160 B2 * | 8/2010 | Braun et al. | 702/167 |
| 2002/0057796 A1 | 5/2002 | Lambert et al. | |
| 2007/0162534 A1 | 7/2007 | Liardet et al. | |
| 2008/0025498 A1 * | 1/2008 | Vasyltsov | 380/28 |

FOREIGN PATENT DOCUMENTS

| | | |
|---|---|---|
| KR | 10-2007-0075665 A | 7/2007 |
| WO | WO 2007/087911 A2 | 8/2007 |

OTHER PUBLICATIONS

Joye, M. et al.; "The Montgomery Powering Ladder"; Revised Papers from the 4$^{th}$ International Workshop on Cryptographic Hardware and Embedded Systems; Lecture Notes in Computer Science; Aug. 13, 2002; pp. 291 to 302; vol. 2523; Springer-Verlag.

Akishita, T.; "Fast Simultaneous Scalar Multiplication on Elliptic Curve with Montgomery Form"; Proceedings of the Second International Symposium on Parallel and Distributed Processing and Applications; Dec. 13-15, 2004; Lecture Notes in Computer Science; Jan. 1, 2001; pp. 255 to 267; vol. 2259; Springer-Verlag; ISBN: 978-3-540-24128-7.

(Continued)

*Primary Examiner* — Longbit Chai (74) *Attorney, Agent, or Firm* — Etienne de Villiers; Dimock Stratton LLP (57) ABSTRACT

A system and method are provided enabling implicit redundancies such as constant differences and points that should be on the same curve, to be checked at the beginning, end and intermittently throughout the computation to thwart fault injection attacks. This can be implemented by checking the constant difference in point pairs during point multiplication, by checking constant scalings in exponentiation pairs, and by checking that any intermediate point is on the curve and/or in the correct subgroup of the curve.

27 Claims, 8 Drawing Sheets

OTHER PUBLICATIONS

Fischer, W. et al.; "Parallel scalar multiplication on general elliptic curves over $F_p$ hedged against Non-Differential Side-Channel Attacks"; Jan. 9, 2002; Retrieved from http://epring.iacr.org/2002/007/.

Biehl, I. et al.; "Differential Fault Attacks on Elliptic Curve Cryptosystems"; Advances in Cryptology—Crypto 2000 Proceedings; Aug. 20-24, 2000; Lecture Notes in Computer Science; pp. 131 to 146; vol. 1880; Springer-Verlag; ISBN: 978-3-540-67907-3.

Prins, Leendert; Supplementary Search Report from corresponding European Application No. 08845362.6; search completed Sep. 28, 2010.

Mangard, S. et al.; Power Analysis Attacks: Revealing the Secrets of Smart Cards; 2007; pp. 4 and 5; Springer-Verlag.

Bar-El, H.; et al.; "The Sorcerer's Apprentice Guide to Fault Attacks"; Proceedings of the IEEE, Special Issue on Cryptography and Security, Feb. 2006; pp. 370 to 382; vol. 96, No. 2.

Fouque, P.-A. et al.; "Fault Attack on Elliptic Curve with Montgomery Ladder Implementation"; 2008; pp. 92 to 98; Proceedings of the $5^{th}$ International Workshop on Fault Diagnosis and Tolerance in Cryptography.

Engel, Lawrence J.; International Search Report from corresponding PCT Application No. PCT/CA2008/001872; Completed Feb. 17, 2009, received by applicant Mar. 4, 2009.

* cited by examiner

FAULT DETECTION IN EXPONENTIATION AND POINT MULTIPLICATION OPERATIONS USING A MONTGOMERY LADDER

CROSS-REFERENCE TO RELATED APPLICATIONS

This application claims priority from U.S. application Ser. No. 60/983,872 filed on Oct. 30, 2007, hereby incorporated by reference.

FIELD OF THE INVENTION

The invention relates to fault detection during point multiplication and exponentiation operations using a Montgomery ladder.

BACKGROUND

Cryptographic systems generally owe their security to the fact that a particular piece of information is kept secret, without which it is infeasible if not nearly impossible to break the scheme. Although the secret information is generally stored within a secure boundary in a cryptographic processor, which makes it difficult for an attacker to get at it directly, various schemes or attacks are known that attempt to obtain the secret information. A well known attack is a timing or "side channel attack", which exploits some implementation aspect of a cryptographic algorithm such as the sequential computational operations.

For example, group operations, called multiplication modulo n in RSA schemes, and addition of points in Elliptic Curve (EC) schemes are sequentially repeated in a particular way to perform a scalar operation. In RSA, the operand is an exponent, the operation is exponentiation, and a method of multiplying is commonly known as repeated "square-and-multiply". In EC, the operand is a scalar, the operation is a scalar multiplication of a point, and a method of multiplying is known as "double-and-add". Both methods are well known in the art and thus further details need not be discussed.

Many techniques have been employed to ascertain a private key using power analysis. For example, careful analysis of an end-to-end waveform can decompose the order of double-and-add or square-and-multiply operations. Using the standard algorithms, either a double or a square occurs for each bit of either the exponent or scalar multiplier respectively and an "add" occurs where the bit is a notional '1'. Therefore, the instances where double waveforms are adjacent each other represent bit positions with zeros and for add waveforms this indicate bits with a one. These timing measurements can thus be analysed by an attacker to find the entire secret key and compromise the cryptographic system.

In addition to square-and-multiply and double-and-add techniques, other methods to compute a point multiple such as kP or a modular exponentiation such as $g^e$ use, for example, the well known "binary ladder" or Montgomery method. Using this method for EC operations, the x-coordinates of the pair of points $(k_iP, (k_i+1)P)$ are computed. The Montgomery method is an efficient algorithm for performing moduli multiplication, illustrated by the following example.

Given a group $E(F_p)$ and given a point P on the elliptic curve, the Montgomery method may be used to compute another point kP which is a scalar multiple of the point P. Given an ordered pair of points $(k_iP, (k_i+1)P)$, for each bit of the binary representation of k, if the bit is a zero then the next set of points is computed by doubling the previous first point to obtain the first point in the next pair, and adding a one to this result to form the second point in the next pair, namely: $(2k_iP, (2k_i+1)P)$. If the bit is a one, then the next set of points is computed by adding the previous points together to form the first point in the next pair, and adding a one to this result to form the second point in the next pair, namely: $((2k_i+1)P, (2k_i+2)P)$. It can be seen that the first point of the next pair is derived from a doubling or adding operation depending on whether the bit is a 0 or 1. In an RSA scheme, The Montgomery method is used for exponentiation, where the ordered pair of points is $(g^e, g^{e+1})$.

In a cryptographic processor, each of the double and adds or square and multiplies involve multiple operations which generate unique power signatures. By observing these power signatures the attacker may derive a sequence of zeros and ones and thus the scalar or exponent being used. The Montgomery method however is preferable in EC cryptographic (ECC) systems because of its extreme efficiency over the standard double-and-add.

As described in U.S. Pat. No. 6,738,478 to Vanstone et al. issued May 18, 2004, a scheme is presented where the double and add operations are performed consistently in Montgomery operations to produce a consistent power signature waveform and thus provide little information to a potential attacker. This improved scheme operates as follows, while examining the bits of the scalar. If the bit is a zero, the first element of the input pair (a, b) is doubled and stored in the first element of the output pair (a', b'), while the first and second elements of the input are added (i.e. a+b) and placed in the second element b' of the output pair (a', b'). If the bit is a one, the second element b of the input pair is doubled and stored in the second element of the output pair (a', b'), while the first and second elements are added and placed in the first element of the output pair (a', b'). These steps are repeated for all bits of the scalar k. By performing the doubling operation, followed by the add operation for each bit, regardless of whether the bit is a one or zero, the operations are consistent for each bit.

Although the uniformity of the improved Montgomery method described above is useful in protecting the system from side channel attacks, it does not address or provide protection against fault injection. This is because fault injection attacks are active and do not necessarily rely on the observation of the timing or power consumption of certain operations. As such, a fault injection attack can be successful despite efforts to guard against side-channel attacks. Fault injection is a technique where errors are introduced into a cryptographic module in some way, in hope that erroneous results might reveal some secret keying information. Such faults can for example be induced by clock glitches, power glitches or by changing the temperature of the environment.

Fault injection attacks can be provisional (transient or reversible) or destructive (permanent). In either case, if performed during a cryptographic operation, one or more of the cryptographic computations may be altered in a specific way to possibly reveal details of a secret value. In the case of a Montgomery ladder, for example, an attacker may be interested in injecting a fault in to the binary ladder operations to reveal the random value k that is used as a private key.

It is therefore an object of the following to provide a method and apparatus for performing fault detection in cryptographic operations, in particular during exponentiation and point multiplication.

SUMMARY

It has been recognized that the implicit redundancy and consistency of intermediate results that are maintained during certain cryptographic operations such as exponentiation and point multiplication when calculated via the Montgomery Ladder can be checked at various times during the operation, to protect against the injection or inducement of faults in the computation.

In one aspect, a method of fault detection in a cryptographic operation is provided comprising checking in at least one sub-step, implicit redundancy maintained during computations performed in the cryptographic operation calculated via the Montgomery Ladder.

In another aspect, there is provided a cryptographic module for performing cryptographic operations using a Montgomery Ladder, the cryptographic module being configured for fault detection during execution of the cryptographic operation by checking in at least one sub-step, implicit redundancy maintained during computations performed in the Montgomery Ladder.

In yet another aspect, there is provided a cryptographic module for performing cryptographic operations using a Montgomery Ladder, the cryptographic module being configured for fault detection during execution of the cryptographic operation by checking in at least one sub-step, implicit redundancy maintained during computations performed in the Montgomery Ladder.

BRIEF DESCRIPTION OF THE DRAWINGS

An embodiment of the invention will now be described by way of example only with reference to the appended drawings wherein.

DETAILED DESCRIPTION OF THE DRAWINGS

Figure 1:
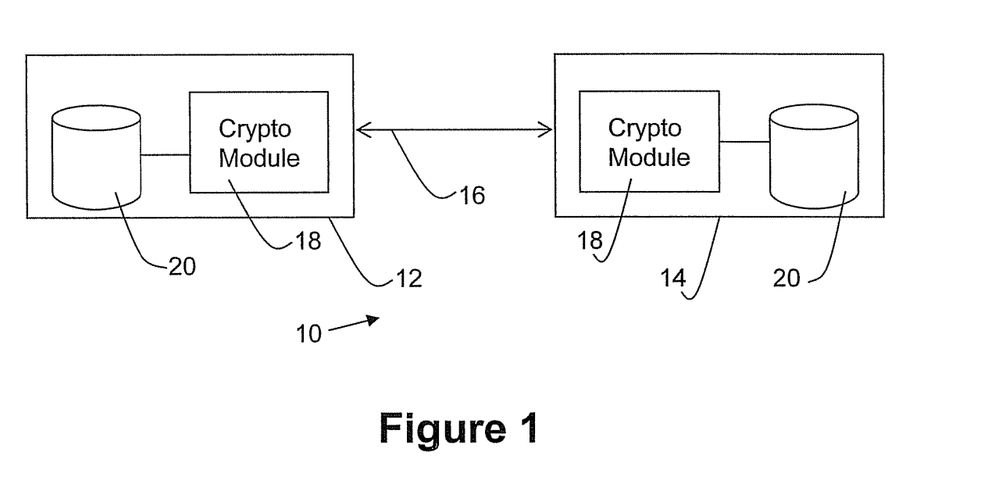
FIG. 1 is a schematic diagram of a cryptographic communication system.

Referring now to FIG. 1, a data communication system 10 includes a pair of correspondents, designated as a first correspondent 12 and a second correspondent 14 each capable of being a sender or recipient in the system 10 and capable of communicating over a data connection 16. Each correspondent 12,14 has a cryptographic or 'crypto' module 18, which is capable of performing cryptographic operations such as encryption/decryption, signing/verifying, and other cryptographic operations such as elliptic curve operations in an underlying field. Each correspondent 12, 14 also includes a memory or data storage element 20 that is used to store cryptographic parameters, private and/or public keys and other information required to perform cryptographic operations using the module 18. The module 18 and/or memory 20 may include, if necessary, a secure storage area for storing sensitive/secret information, e.g. a private key. It will be appreciated that the memory 20 may be either external to the module 18 (as shown) or may instead be a component which is internal to the module 18. It will be appreciated that all or portions of the cryptographic module 18 may be implemented by a processor executing computer instructions stored on a non-transitory computer readable storage medium, a configuration of hardware capable of performing such instructions, or a combination of non-transitory computer readable media and cryptographic hardware.

In one embodiment, the cryptographic module 18 is configured for performing elliptic curve operations, e.g. Montgomery's method for point multiplication. Given a group $E(F_p)$, which is the set of points defined by elements of the field $F_p$ that satisfies the elliptic curve E, and given a point P on the elliptic curve E, the Montgomery method may be used to compute another point kP. For example, in the ElGamal scheme for elliptic curves, one is required to compute $r=kP=(x,y)$ and, during signature verification, the recipient may verify the signature by calculating $sP-eQ=r$ or, in ECDSA, by calculating $X=(u_1P+u_2Q)$, where $u_1$ and $u_2$ are certain integers. Each of these operations involves computing a point multiplication, which can be done using Montgomery's method. It should be noted that the principles discussed herein are applicable to groups commonly used in cryptographic systems, such as $F_p$ (the integers mod p) and $F_{2^m}$.

Figure 2A:
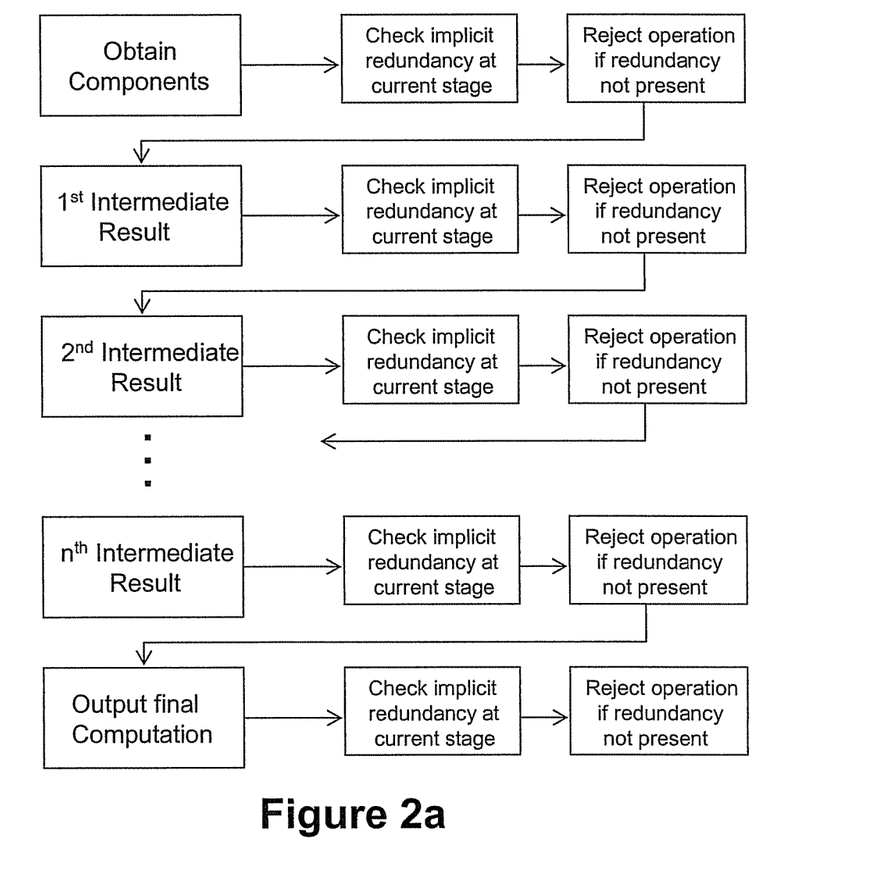
FIG. 2a is a flow diagram illustrating a fault detection process performed serially during a cryptographic operation.
Figure 2B:
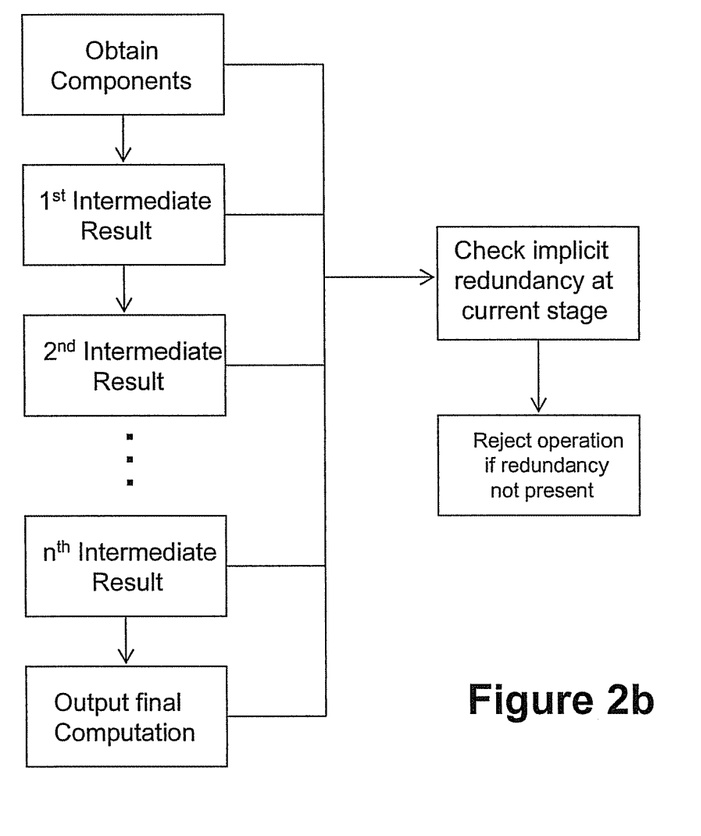
FIG. 2b is a flow diagram illustrating a fault detection process performed in parallel during a cryptographic operation.

During cryptographic operations utilizing a Montgomery ladder, at least one intermediate result is obtained in the course of producing the final computation that is to be output, namely the x-coordinates of a pair of points $(Q_0, Q_1)$ which represent the points $(k_iP, (k_i+1)P)$ computed up the ladder in obtaining kP. It has been recognized that there is implicit redundancy which maintains a consistency in the relationship between $Q_0$ and $Q_1$ all the way up the ladder. As such, the current intermediate result in the Montgomery ladder can be checked for this redundancy at any one or more of the intermediate stages, as shown in FIGS. 2a and 2b, to determine if a fault has been injected into the system. It will be appreciated that the implicit redundancy can be considered generally as one or more characteristics or parameters during a computation that should be consistent throughout and thus can be checked at any time to ensure consistency. The operation may then be rejected if the redundancy is not present. As shown in FIG. 2a, in one variation, the implicit redundancy is checked at each stage before proceeding to the next stage in the ladder, i.e. serially. In FIG. 2b, a parallel alternative is exemplified. It will be appreciated that either a parallel or serial implementation may be used depending on the requirements of the system. For example, it may be desirable to not allow the computation to continue until the redundancy is checked as shown in FIG. 2a. However, depending on how fast the redundancy check can be performed, it may be more suitable to perform the check in parallel and ensure each check has completed before the actual result is accepted.

One way to check the implicit redundancy is to ensure that the constant difference or scaling in the pairs of numbers that are maintained during the Montgomery ladder, e.g. where kP and (k+1)P are maintained. Another way to check the implicit redundancy is that any intermediate point should still be a point on the curve.

It should be noted that checking a constant difference, constant scaling or that an intermediate point is on the curve can be done directly when using affine coordinates. However, since a Montgomery ladder maintains only the x-coordinate of the intermediate points until the end of the computation, the y-coordinate would need to be recovered at each stage in order to directly check the constant difference, constant scaling, that the point is on the curve or other implicit redundancy. Typically, a Montgomery ladder is computed using projective coordinates, which maintains the projective X and Z coordinates. From the projective X and Z coordinates, the projective Y coordinate can be computed and a projective curve formula evaluated to verify that the implicit redundancy has been maintained. The case where projective coordinates are used to perform the check is explained in greater detail below following conceptual examples that can be implemented directly using affine coordinates or indirectly when using projective coordinates as computing power permits.

Figure 3:
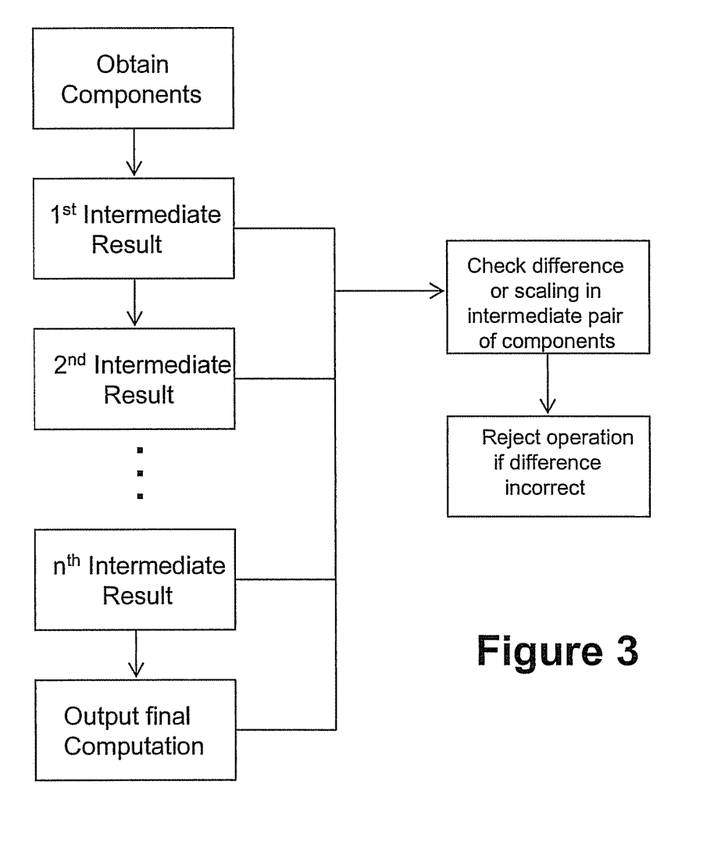
FIG. 3 is a flow diagram illustrating a fault detection process which evaluates a difference or scaling of components maintained during the cryptographic operation.

Turning now to FIG. 3, a method of fault detection is shown where the difference between a pair of components of the intermediate results during the Montgomery ladder is checked in at least one intermediate step to ensure that the difference is constant or consistent throughout as redundantly required by the Montgomery ladder operation. While computing the Montgomery ladder for point multiplication, the constant difference maintained between a pair of components is $(k_iP, (k_i+1)P)$. While computing the Montgomery ladder for modular exponentiation, the constant scaling $(g^{(e_i)}, g^{(e_i+1)})$ is maintained. It has been recognized that in this scenario, the difference or scaling can be checked at the end of the computation and intermittently during any one or more intermediate stages. Again, for EC schemes, this is done directly when using affine coordinates, or projectively when using projective coordinates. The method shown in FIG. 3 proceeds by obtaining the components for the operation (e.g. k and P or g and e) and undergoing the computation where, preferably, the difference or scaling is checked at each stage and, if one or more difference or scaling is incorrect, the operation is rejected. Alternatively, if the difference is correct, the computation may continue. Although the checks are performed in parallel in FIG. 3, they can also be performed serially per FIG. 2a.

Figure 4:
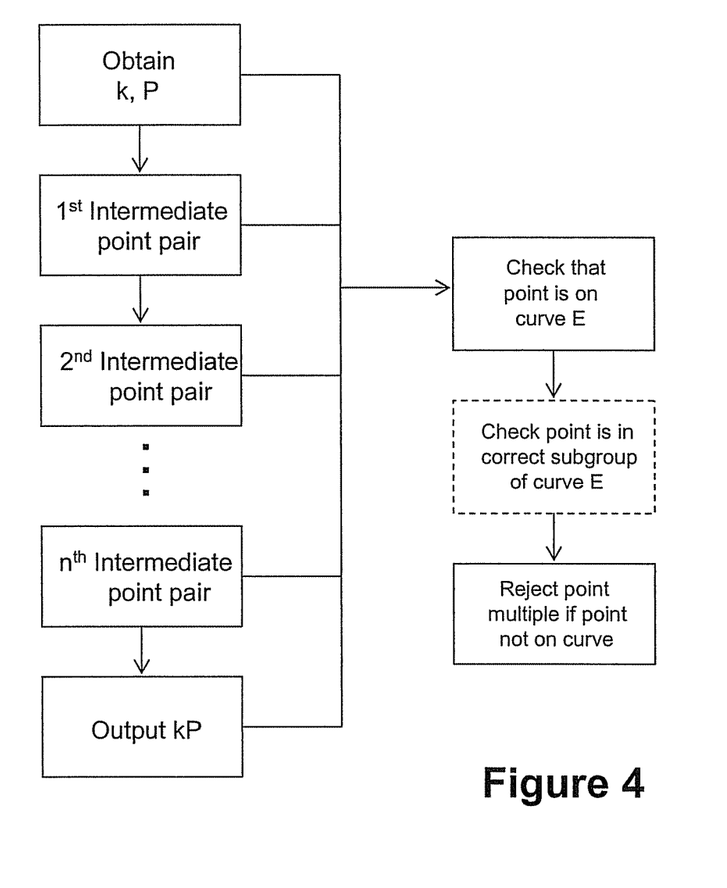
FIG. 4 is a flow diagram illustrating a fault detection process during point multiplication which checks that points during the operation are on the elliptic curve.

FIG. 4 shows a method of fault detection, which is similar to that shown in FIG. 3, but where either one or both of the intermediate points $(k_iP, (k_i+1)P)$ in whatever form are checked to ensure that such points are on the curve E. If the points checked are on the curve, the computation continues, or if they are not on the curve, the point multiple is rejected. It can be seen in FIG. 4, that this type of redundancy can be checked at the beginning of the operation as well as at the intermediate stages as the output kP is being computed and at the end of the computation. The redundancy in this embodiment is that the intermediate points are also on the curve. Again, one way to do this directly is to recover the corresponding y coordinate from the x coordinate that is maintained during the computation, and then determine whether or not the (x, y) pair satisfies the elliptic curve equation. However, since recovering the y coordinate requires an inversion, this may be considered too computationally expensive. As will be exemplified below, the use of projective coordinates enables the projective Y coordinate to be recovered using the readily available X and Z coordinates maintained during computation of the ladder. The X, Y, Z projective coordinates can then be checked using the projective curve formula. In either case, conceptually ensuring that the point is on the curve is important since an erroneous point could reveal information in k, which may be a private key. It may be noted that at the same time as checking that the point is on the curve, a check can be done to see if the point is in the correct subgroup of the curve.

Figure 5:
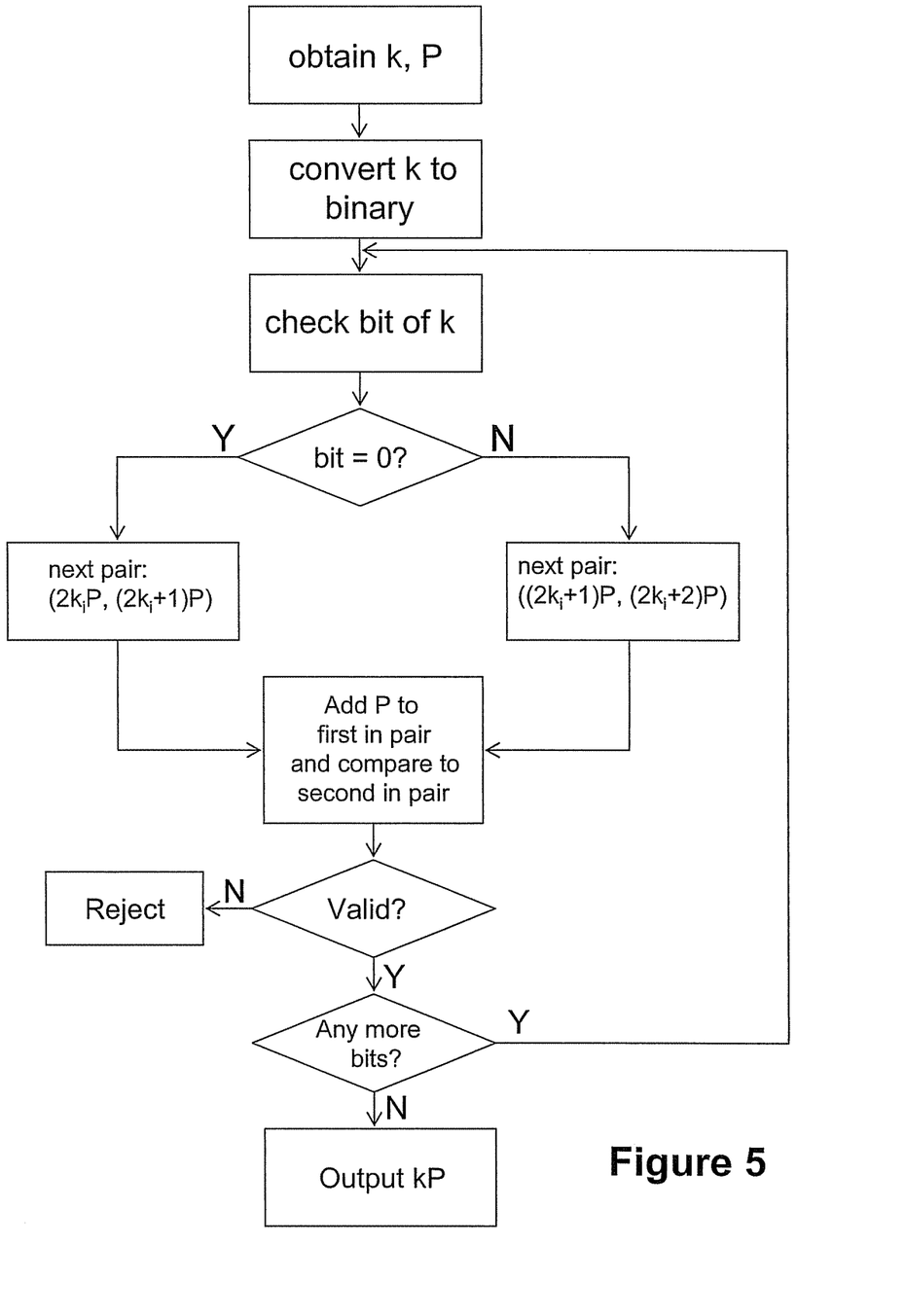
FIG. 5 is a flow diagram illustrating execution of the process in FIG. 3 during a point multiplication operation.
Figure 6:
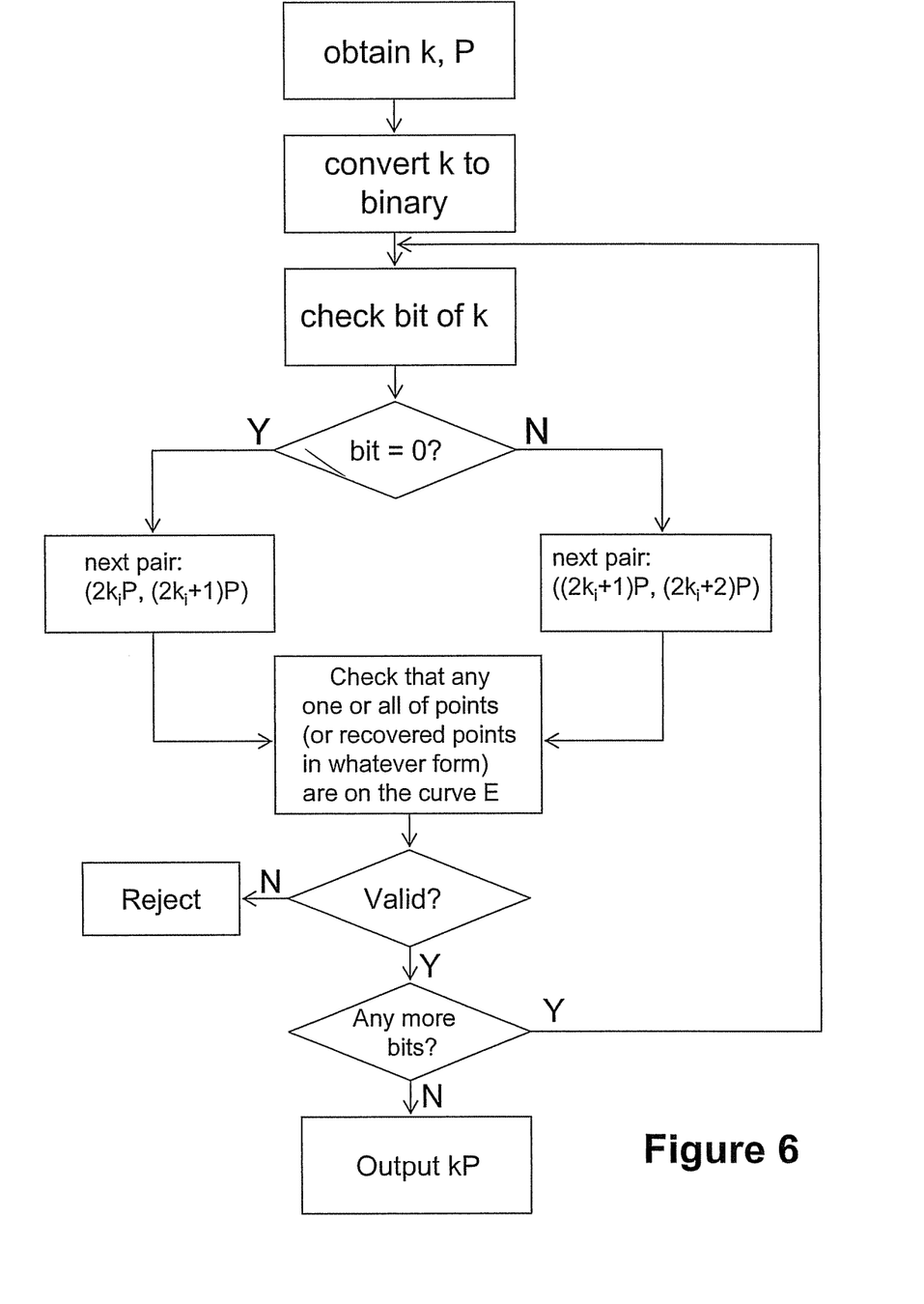
FIG. 6 is a flow diagram illustrating execution of the process in FIG. 4 during a point multiplication operation.

Turning now to FIGS. 5 and 6, the use of a fault detection process during computation of a point multiple kP is shown in more detail. In FIG. 5, the fault detection step checks, after each intermediate step, that the difference maintained during the computation is constant. As the difference should be P, adding P to one intermediate point and comparing it to the other intermediate point will determine if the requisite property is present. In FIG. 6, the fault injection detection step checks that any one or all of the points maintained during the computation are on the curve.

The point multiplication operation begins by obtaining the components k and P. The scalar k is then converted (if not done so already) to a binary form. Each bit of k is then evaluated in turn. If the bit is a zero, the next pair is the x-coordinates of $(2k_iP, (2k_i+1)P)$ and if the bit is not a zero (i.e. a 1), the next pair is the x-coordinates of $((2k_i+1)P, (2k_i+2)P)$. It can be seen that in either case, there is a constant difference of P between the first and second points in the pair. As shown in FIG. 5, this difference can, if done directly using affine coordinates, be checked by adding P to the first component and comparing the result to the second point in the pair. If the two values are equal, then the point pair at that bit are presumed valid and, if not, the operation is rejected. This process is repeated for each bit in k and if all stages are valid, including the final output, the value kP is output and presumed to have avoided any fault injection. It should again be noted that in the case where the Montgomery ladder maintains only the x-coordinate during the computation, the y-coordinate would need to be recovered for both $k_iP$ and $(k_i+1)P$ in order to add the point P, which also has both x and y coordinates.

As shown in FIG. 6, whether the bit in k is a zero or a one, either or both of the points in the current pair, in whatever form are checked to see if they are on the curve E. Again, if affine coordinates are being used, the y-coordinate would need to be recovered first, for each point being evaluated. At this time, the optional additional check regarding whether the point is in the correct subgroup of the curve can also be performed. It will be seen from FIGS. 5 and 6 that various implicit redundancies can be checked at the intermediate stages. In this way, the fact that there is a relationship between the two points maintained in the ladder can be used to ensure that a fault has not been injected during the operation. If a fault has been injected, the relationship should no longer hold. Also, since the relationship is consistent, there is a redundancy in the Montgomery ladder that, if not maintained, provides an indication that something out of the ordinary has occurred. There may be other relationships between the two points maintained during the ladder, other than a difference or scaling or being on the curve, which if determined, can also be checked using the same principles.

It will be appreciated that both checks can be done during the same operation by using both fault detection steps in parallel or series once the next pair is computed, i.e. checking that the point is on the curve and that the difference checks out for each intermediate step. It will also be appreciated that for modular exponentiation, the fault detection step would involve checking the scaling between the pair of exponentiations, e.g. by checking that $g \times g^{(e_i)} = g^{(e_i+1)}$.

Figure 7:
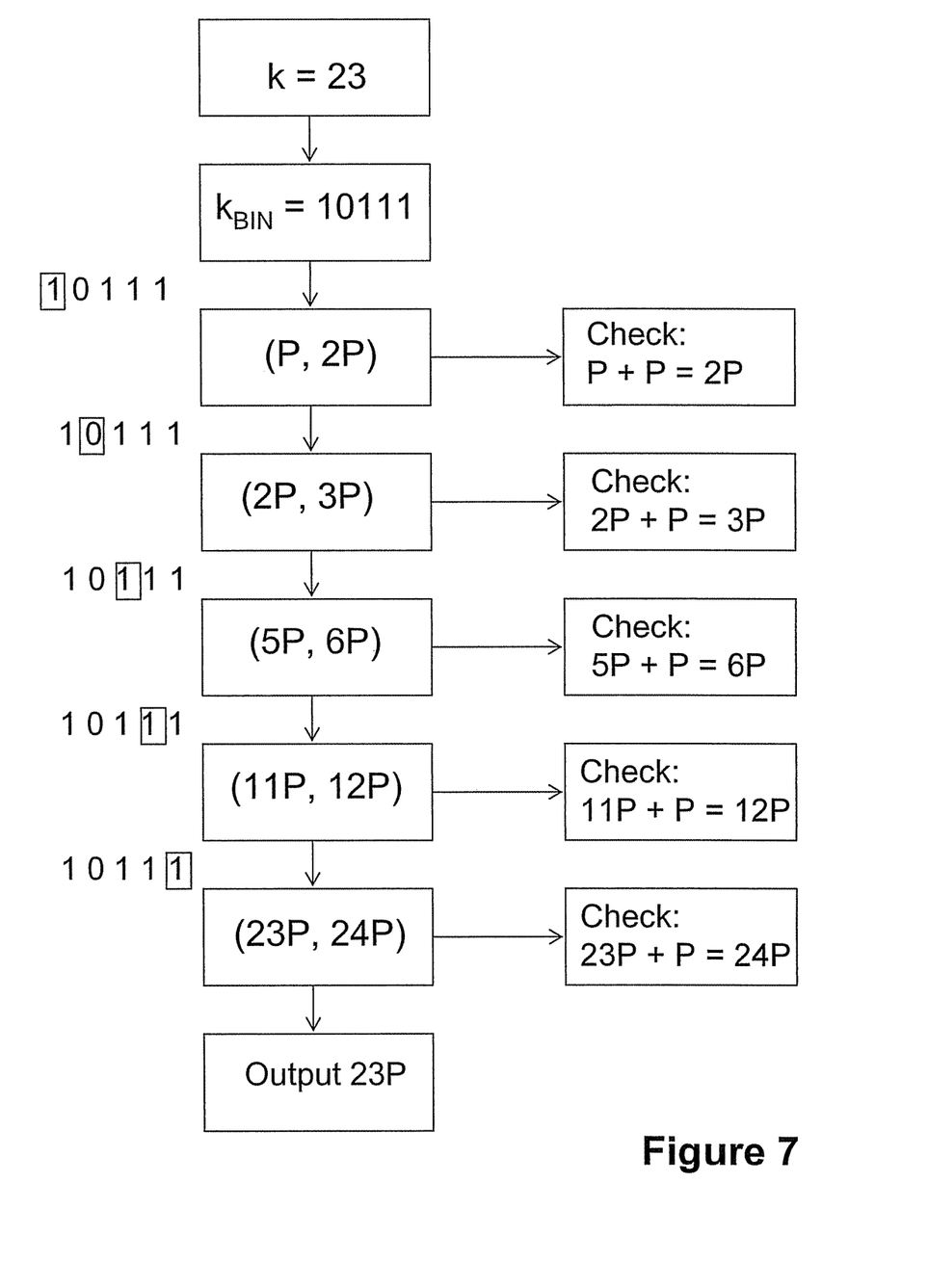
FIG. 7 is a flow diagram illustrating an example computation according to the process shown in FIG. 5.

FIG. 7 shows a specific example for checking a constant difference during the point multiplication kP where k=23. The binary value for 23 is 10111. Since the first bit is 1, and the current $k_i$ is zero (initialized), the first pair is (P, 2P) according to $((2k_i+1)P, (2k_i+2)P)$. This intermediate result is checked by adding P+P and checking this against 2P. Prior to adding 'P' to the point $k_iP$, the y-coordinate would need to be recovered when using affine coordinates. In this way, P can be added directly and the result compared to the other point in the ladder. If they are equal then the pair is presumed to be valid. The next bit in k is a zero and thus the next pair is (2*P, 2*P+1)=(2P, 3P) according to the formula $(2k_iP, (2k_i+1)P)$. At this stage, P is added to 2P and compared to 3P. The next bit is again a one and thus the next pair is (5P, 6P). To check this intermediate value, P is added to 5P and checked against 6P. The next bit is also a one and thus the next pair is (11P, 12P). The check at this stage adds P to 11P and compares this to 12P. The final bit is a one and thus the next and final pair is (23P, 24P). The final check adds P to 23P and compares to 24P. If this check is successful, the value 23P (i.e. the first point multiple in the last pair) is output as the result kP=23P. It can thus be seen in the example of FIG. 7 that any one of the intermediate steps in the Montgomery ladder provides enough information to enable a relationship between the two points maintained during the computation to be checked for consistency.

It will be appreciated that there are other possible constant differences that are used in Montgomery ladder computations, such as where the pair $((k_i-1)P, k_iP)$ is maintained. Since there is also a constant difference, P can be added to $(k_i-1)P$ and checked against $k_iP$ as above. It can thus be seen that the above fault detection schemes can be readily applied to any implicit redundancy, in particular where constant differences or scalings are maintained during a Montgomery ladder computation.

As discussed above, in an elliptic curve multiplication using the Montgomery ladder, a representation of a pair of points $(Q_0, Q_1)=((k_i-1)P, k_iP)$ is maintained during the computation. Typically, the representation of points $(Q_0, Q_1)$ maintain only the projective X and Z coordinates. Whereas affine coordinates can be used directly to check the constant difference or check that either or both of the points are on the curve, when projective coordinates are used, the projective Y coordinate of $Q_0$ is required to ensure that the inherent relationship between $Q_0$ and $Q_1$ is consistently maintained.

Figure 8:
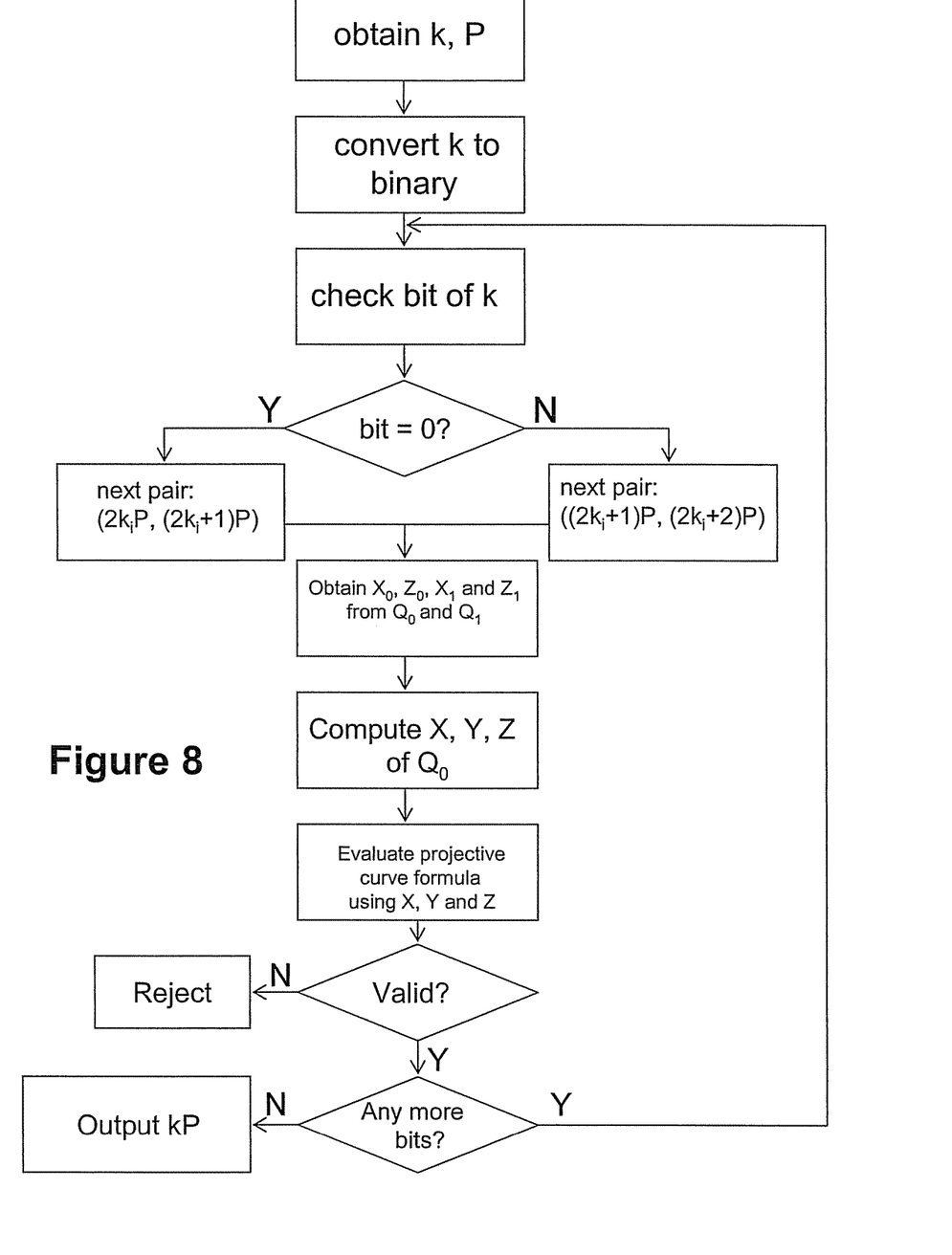
FIG. 8 is a flow diagram illustrating execution of the process in FIG. 4 during a point multiplication operation utilizing projective coordinates.

Turning now to FIG. 8, the execution of the process shown in FIGS. 5 and 6 is illustrated when using projective coordinates. When using projective coordinates, as is often preferred, then for the purpose of checking that a point is on the curve, the projective coordinate Y of $Q_0$, which is usually the point of interest, is recovered, and the corresponding projective X and Z coordinates are computed. In this example, uppercase X, Y and Z signifies that the coordinate is projective, and $(X_0, Z_0)$ and $(X_1, Z_1)$ refer to the X and Z projective coordinates maintained for $(Q_0, Q_1)$ during computation of the Montgomery ladder.

For example, for elliptic curves defined over prime fields by $y^2=x^3+ax+b$, the projective coordinates of point $Q_0$ (representing $k_iP$) can be computed as follows:

$$X=2yX_0Z_1Z_0$$

$$Y=2bZ_1Z_0^2+Z_1(aZ_0+xX_0)(xZ_0+X_0)-X_1(xZ_0-X_0)^2$$

$$Z=2yZ_1Z_0^2$$

Using X, Y and Z thus computed, the projective curve formula:

$Y^2Z=X^3+aXZ^2+bZ^3$ can be evaluated to confirm that the relationship between $Q_0$ and $Q_1$ has been consistently maintained. If something in $(X_0, Z_0)$ or $(X_1, Z_1)$ has been altered (e.g. fault injection), then the left and right sides of the above projective curve formula will produce dissimilar results, which inherently indicates that the constant difference has not been maintained and the affine point that corresponds to the computed projective point, is not on the curve E. As such, it can be seen that when using projective coordinates, the inherent redundancy is 'indirectly' evaluated when compared to the conceptual affine examples shown in FIGS. 5-7.

Alternatively, the modified projective curve formula: $Z(Y^2-bZ^2)=X(X^2+aZ)$ can be used to evaluate the relationship of the intermediate points. It can be appreciated that any change in the curve parameters a, b, the input point P=(x, y), or the ladder points $Q_0=(X_0, Z_0)$ and $Q_1=(X_1, Z_1)$ in the course of the main loop execution will, with a high probability, be detected by checking the redundancy as described herein.

The above fault detection principles can also be applied to multidimensional Montgomery ladder point multiplication, described in U.S. application Ser. No. 60/946,634, filed on Jun. 27, 2007. In a simple example, multidimensional Montgomery ladders can be used to compute the bi-linear multiple kP+rQ. In this case, there are nonetheless invariant relationships maintained between components. These relations can be checked as a protection against fault injection using the principles above.

It can therefore be seen that implicit redundancies such as constant differences and points that should be on the same curve, can be checked at the beginning, end and intermittently throughout the computation to thwart fault injection attacks. If a fault is injected at any stage throughout the computation, the fault can be detected since the injected fault would likely change the relationship, which is supposed to be implicitly redundant. As shown above, this can be implemented by checking the constant difference in point pairs during point multiplication, by checking constant scalings in exponentiation pairs, and by checking that any intermediate point is on the curve and/or in the correct subgroup of the curve. It will be appreciated that any combination of two or more of these fault detection steps can be made to add further protection to the system and/or to accommodate different types of computations. It has also been shown that the relationship between the two points maintained during computation of the Montgomery ladder can be checked in various ways, either directly if using affine coordinates (e.g. by recovering the y-coordinate) or indirectly using projective coordinates and the projective curve formula.

Although the invention has been described with reference to certain specific embodiments, various modifications thereof will be apparent to those skilled in the art without departing from the spirit and scope of the invention as outlined in the claims appended hereto.

The invention claimed is:

1. A method of fault detection in a cryptographic operation, said cryptographic operation being an elliptic curve (EC) application of a Montgomery Ladder using a point P performed by a processor, said method comprising:
   said processor obtaining intermediate points corresponding to an intermediate result computed in said cryptographic operation; and,
   said processor checking, in at least one sub-step, that a constant difference of said intermediate points is maintained by recovering a Y coordinate for each of said intermediate points, and evaluating a projective curve formula using said Y coordinates and said intermediate result.

2. The method of claim 1 wherein said intermediate points comprise a pair of scalar multiples of P in projective coordinates, said constant difference being checked by computing said Y projective coordinates from corresponding X and Z projective coordinates of said pair of scalar multiples and using said X, Y and Z projective coordinates to solve said projective curve formula.

3. The method according to claim 1, wherein said checking is performed after each step in said cryptographic operation and before a next step can be performed.

4. The method according to claim 1, wherein said checking is performed in parallel with said cryptographic operation.

5. The method according to claim 1, further comprising rejecting said cryptographic operation if said constant difference is not maintained.

6. The method according to claim 1, wherein said intermediate result comprises a result of each stage of said Montgomery Ladder.

7. The method according to claim 1, wherein said intermediate result comprises a pair of scalar multiples of P, wherein each intermediate point comprises X and Z projective coordinates, and wherein said constant difference being checked by:
computing, for each of said multiples, said projective Y coordinates using said projective X and Z coordinates of that multiple;
adding P to said first multiple, and,
comparing the addition to said second multiple and accepting said intermediate result if they correspond.

8. The method according to claim 7, wherein said projective Y coordinate is computed using the following formula: $Y=2bZ_1Z_0^2+Z_1(aZ_0+xX_0)(xZ_0+X_0)-X_1(xZ_0-X_0)^2$.

9. The method according to claim 1, wherein said elliptic curve is defined by: $y^2=x^3+ax+b$; and said projective curve formula is defined by: $Y^2Z=X^3+aXZ^2+bZ^3$.

10. A non-transitory computer readable storage medium comprising computer instructions, when executed by a processor results in a computer performing the functions of fault detection in a cryptographic operation, said cryptographic operation being an elliptic curve (EC) cryptographic application of a Montgomery Ladder using a point P, said instructions operative to enable the processor to:
obtain intermediate points corresponding to an intermediate result computed in said cryptographic operation; and,
check, in at least one sub-step, that a constant difference of said intermediate points is maintained by recovering a Y coordinate for each of said intermediate points, and evaluating a projective curve formula using said Y coordinates and said intermediate result.

11. The non-transitory computer readable storage medium of claim 10, wherein said intermediate points comprise a pair of scalar multiples of P in projective coordinates, said constant difference being checked by computing said Y projective coordinates from corresponding X and Z projective coordinates of said pair of scalar multiples and using said X, Y and Z projective coordinates to solve said projective curve formula and verify correspondence.

12. The non-transitory computer readable storage medium of claim 10, wherein said check is performed after each step in said cryptographic operation and before a next step can be performed.

13. The non-transitory computer readable storage medium of claim 10, wherein said check is performed in parallel with said cryptographic operation.

14. The non-transitory computer readable storage medium of claim 10, wherein said instructions are further operative to enable said processor to reject said cryptographic operation if said constant difference is not maintained.

15. The non-transitory computer readable storage medium of claim 10, wherein said intermediate result comprises a result of each stage of said Montgomery Ladder.

16. The non-transitory computer readable storage medium of claim 10, wherein said intermediate result comprises a pair of scalar multiples of P, wherein each intermediate point comprises X and Z projective coordinates, and wherein said processor is operative to check said constant difference by:
computing, for each of said multiples, said projective Y coordinates using said projective X and Z coordinates of that multiple;
adding P to said first multiple, and,
comparing the addition to said second multiple and accepting said intermediate result if they correspond.

17. The non-transitory computer readable storage medium of claim 10, wherein said projective Y coordinate is computed using the following formula: $Y=2bZ_1Z_0^2+Z_1(aZ_0+xX_0)(xZ_0+X_0)-X_1(xZ_0-X_0)^2$.

18. The non-transitory computer readable storage medium of claim 10, wherein said elliptic curve is defined by: $y^2=x^3+ax+b$; and said projective curve formula is defined by: $Y^2Z=X^3+aXZ^2+bZ^3$.

19. A cryptographic hardware module for performing fault detection in a cryptographic operation, said cryptographic operation being an elliptic curve (EC) application of a Montgomery Ladder using a point P, said cryptographic hardware module comprising:
a processor operative to:
obtain intermediate points corresponding to an intermediate result computed in said cryptographic operation; and,
check, in at least one sub-step, that a constant difference of said intermediate points is maintained by recovering a Y coordinate for each of said intermediate points, and evaluating a projective curve formula using said Y coordinates and said intermediate result.

20. The cryptographic hardware module of claim 19, wherein said intermediate points comprise a pair of scalar multiples of P in projective coordinates, said constant difference being checked by computing said Y projective coordinates from corresponding X and Z projective coordinates of said pair of scalar multiples and using said X, Y and Z projective coordinates to solve said projective curve formula and verify correspondence.

21. The cryptographic hardware module of claim 19, wherein said check is performed after each step in said cryptographic operation and before a next step can be performed.

22. The cryptographic hardware module of claim 19, wherein said check is performed in parallel with said cryptographic operation.

23. The cryptographic hardware module of claim 19, wherein said instructions are further operative to enable said processor to reject said cryptographic operation if said constant difference is not maintained.

24. The cryptographic hardware module of claim 19, wherein said intermediate result comprises a result of each stage of said Montgomery Ladder.

25. The cryptographic hardware module of claim 19, wherein said intermediate result comprises a pair of scalar multiples of P, wherein each intermediate point comprises X and Z projective coordinates, and wherein said processor of said cryptographic module is operative to check said constant difference by:
computing, for each of said multiples, said projective Y coordinates using said projective X and Z coordinates of that multiple;
adding P to said first multiple, and,
comparing the addition to said second multiple and accepting said intermediate result if they correspond.

26. The cryptographic hardware module of claim 19, wherein said projective Y coordinate is computed using the following formula: $Y=2bZ_1Z_0^2+Z_1(aZ_0+xX_0)(xZ_0+X_0)-X_1(xZ_0-X_0)^2$.

27. The cryptographic hardware module of claim 19, wherein said elliptic curve is defined by: $y^2=x^3+ax+b$; and said projective curve formula is defined by: $Y^2Z=X^3+aXZ^2+bZ^3$.

* * * * *